(12) United States Patent
Goodfellow

(10) Patent No.: US 8,505,324 B2
(45) Date of Patent: Aug. 13, 2013

(54) INDEPENDENT FREE COOLING SYSTEM

(75) Inventor: John A. Goodfellow, Waterloo (CA)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 362 days.

(21) Appl. No.: 12/911,508

(22) Filed: Oct. 25, 2010

(65) Prior Publication Data

US 2012/0096874 A1 Apr. 26, 2012

(51) Int. Cl.
*F25B 7/00* (2006.01)

(52) U.S. Cl.
USPC ................................. 62/335; 62/434

(58) Field of Classification Search
USPC ................ 62/335, 333, 185, 434, 436, 201, 62/203
See application file for complete search history.

(56) References Cited

U.S. PATENT DOCUMENTS

| | | |
|---|---|---|
| 3,640,084 A | 2/1972 | Hopkins et al. |
| 3,744,264 A | 7/1973 | Ware |
| 3,744,273 A | 7/1973 | Ware |
| 3,864,929 A | 2/1975 | Hopkins |
| 3,864,930 A | 2/1975 | Hopkins |
| 3,992,301 A | 11/1976 | Shippey et al. |
| 4,141,825 A | 2/1979 | Conger |
| 4,163,445 A | 8/1979 | Stanger |
| 4,176,057 A | 11/1979 | Wheatley et al. |
| 4,178,769 A * | 12/1979 | Johnsen .......................... 62/180 |
| 4,214,626 A | 7/1980 | Spethmann |
| 4,347,704 A | 9/1982 | Marquardt et al. |
| 4,380,156 A * | 4/1983 | Ecker ............................ 62/235.1 |
| 4,391,102 A | 7/1983 | Studhalter et al. |
| 4,406,138 A | 9/1983 | Nelson |
| 4,446,703 A | 5/1984 | Gilbertson |
| 4,772,385 A | 9/1988 | Yamada et al. |
| 4,921,610 A | 5/1990 | Ford et al. |
| 5,040,377 A | 8/1991 | Braun et al. |
| 5,050,394 A * | 9/1991 | Dudley et al. .................... 62/115 |
| 5,101,639 A | 4/1992 | Wruck et al. |

(Continued)

FOREIGN PATENT DOCUMENTS

| | | |
|---|---|---|
| JP | 63004808 | 1/1988 |
| JP | 6254553 | 9/1994 |

(Continued)

OTHER PUBLICATIONS

Trane Engineers Newsletter, vol. 20, No. 3, 1991.

*Primary Examiner* — Mohammad M Ali
(74) *Attorney, Agent, or Firm* — Snell & Wilmer, LLP

(57) ABSTRACT

A free cooling system may include first and second conduits configured to carry first and second fluids, a cooling load configured to transfer heat to the first fluid, thereby causing the first fluid to have a post-loading temperature, a free cooling device configured to transfer heat from the second fluid to atmospheric air, thereby causing the second fluid to have a post-cooling temperature, a heat exchanger configured to facilitate a heat exchange between the first and second fluids of the first and second conduits, thereby causing the first fluid to have a pre-loading temperature and the second fluid to have a pre-cooling temperature, and a fluid flow control device configured to control a first flow rate of the first fluid and a second flow rate of the second fluid, such that the post-cooling temperature is less than the pre-loading temperature by at least a predefined temperature.

20 Claims, 11 Drawing Sheets

(56) References Cited

U.S. PATENT DOCUMENTS

| | | | |
|---|---|---|---|
| 5,131,236 | A | 7/1992 | Wruck et al. |
| 5,131,238 | A | 7/1992 | Meckler |
| 5,133,193 | A | 7/1992 | Wruck et al. |
| 5,138,842 | A | 8/1992 | Wruck et al. |
| 5,170,635 | A | 12/1992 | Wruck et al. |
| 5,172,565 | A | 12/1992 | Wruck et al. |
| 5,198,116 | A | 3/1993 | Comstock et al. |
| 5,355,691 | A * | 10/1994 | Sullivan et al. ............... 62/201 |
| 5,498,338 | A | 3/1996 | Kruger et al. |
| 5,600,960 | A * | 2/1997 | Schwedler et al. ............. 62/99 |
| 5,651,894 | A | 7/1997 | Boyce et al. |
| 5,797,275 | A | 8/1998 | Forsman |
| 5,970,724 | A * | 10/1999 | Weng ........................... 62/121 |
| 6,074,551 | A | 6/2000 | Jones et al. |
| 6,077,435 | A | 6/2000 | Beck et al. |
| 6,185,943 | B1 | 2/2001 | Kopko |
| 6,253,564 | B1 * | 7/2001 | Yarbrough et al. ......... 62/238.7 |
| 6,257,007 | B1 * | 7/2001 | Hartman ........................ 62/183 |
| 6,332,110 | B1 | 12/2001 | Wolfe |
| 6,405,543 | B2 | 6/2002 | Kopko |
| 6,427,464 | B1 * | 8/2002 | Beaverson et al. ......... 62/196.3 |
| 6,556,930 | B1 | 4/2003 | Lueck |
| 6,560,543 | B2 | 5/2003 | Wolfe et al. |
| 6,606,872 | B1 * | 8/2003 | Smith ............................ 62/175 |
| 6,609,070 | B1 | 8/2003 | Lueck |
| 6,640,561 | B2 | 11/2003 | Roberto |
| 6,644,049 | B2 | 11/2003 | Alford |
| 6,666,042 | B1 * | 12/2003 | Cline et al. ..................... 62/175 |
| 6,691,525 | B2 * | 2/2004 | Beaverson et al. ......... 62/196.3 |
| 6,730,227 | B2 | 5/2004 | Zeiher et al. |
| 6,823,684 | B2 | 11/2004 | Jensen |
| 6,848,267 | B2 * | 2/2005 | Pierson .......................... 62/299 |
| 7,036,330 | B2 | 5/2006 | Grabon et al. |
| 7,104,115 | B2 | 9/2006 | Kahn et al. |
| 7,174,273 | B2 | 2/2007 | Goldberg |
| 7,216,698 | B2 | 5/2007 | Catzel |
| 7,371,319 | B2 | 5/2008 | Wood et al. |
| 7,416,644 | B2 | 8/2008 | Bonde |
| 7,581,409 | B2 | 9/2009 | Bailey et al. |
| 7,591,309 | B2 | 9/2009 | Minnich et al. |
| 7,658,079 | B2 * | 2/2010 | Bailey et al. .................... 62/181 |
| 7,669,647 | B2 * | 3/2010 | Tsubone et al. ............. 165/202 |
| 7,749,386 | B2 | 7/2010 | Voutchkov |
| 7,752,852 | B2 * | 7/2010 | Akei et al. ...................... 62/115 |
| 7,757,506 | B2 * | 7/2010 | Ellsworth et al. ............ 62/259.2 |
| 7,980,093 | B2 * | 7/2011 | Kuehl et al. .................... 62/435 |
| 7,984,621 | B2 * | 7/2011 | Park ................................ 62/333 |
| 8,048,311 | B2 | 11/2011 | Wallace et al. |
| 8,075,740 | B2 | 12/2011 | Bailie et al. |
| 8,146,375 | B2 * | 4/2012 | Mohs et al. ..................... 62/113 |
| 8,297,069 | B2 * | 10/2012 | Novotny et al. .............. 62/259.2 |
| 8,322,159 | B2 * | 12/2012 | Park ................................ 62/333 |
| 2003/0000230 | A1 | 1/2003 | Kopko |
| 2003/0015471 | A1 | 1/2003 | Reichwein et al. |
| 2006/0010893 | A1 | 1/2006 | Dominguez |
| 2006/0032823 | A1 | 2/2006 | Harrison et al. |
| 2007/0151925 | A1 | 7/2007 | de los Reyes et al. |
| 2007/0283716 | A1 | 12/2007 | Marsala |
| 2008/0016890 | A1 | 1/2008 | Dominguez |
| 2009/0171512 | A1 | 7/2009 | Duncan |
| 2009/0260381 | A1 | 10/2009 | Bittner et al. |
| 2010/0023166 | A1 | 1/2010 | Chessel et al. |
| 2010/0036530 | A1 | 2/2010 | Chessel et al. |
| 2010/0036531 | A1 | 2/2010 | Chessel et al. |
| 2010/0042265 | A1 | 2/2010 | Rigal et al. |
| 2010/0050669 | A1 | 3/2010 | Poux et al. |
| 2010/0065650 | A1 | 3/2010 | Phillips |
| 2010/0070082 | A1 | 3/2010 | Chessel et al. |
| 2010/0077776 | A1 | 4/2010 | Takenami et al. |
| 2010/0078160 | A1 | 4/2010 | Novotny et al. |
| 2010/0094465 | A1 | 4/2010 | Chessel et al. |

FOREIGN PATENT DOCUMENTS

| | | |
|---|---|---|
| JP | 6254554 | 9/1994 |
| JP | 10192853 | 7/1998 |
| JP | 2001062255 | 3/2001 |
| JP | 2004108864 | 4/2004 |
| JP | 2005052793 | 3/2005 |

* cited by examiner

INDEPENDENT FREE COOLING SYSTEM

BACKGROUND

1. Field

The present invention relates generally to the field of free cooling systems, and more particularly to an independent free cooling system that may operate without the aid of a chiller device.

2. Description of the Related Art

Free cooling may be an economical method of using low external air temperatures to assist in chilling a fluid, which may then be used for industrial processors or air conditioning systems. Conventional free cooling systems may include a chiller device, which may be compression based, to supplement the free cooling process. Because chiller devices may generally consume a considerable amount of energy and generate a lot of background heat, it may hamper the efficiency of conventional free cooling systems.

Moreover, conventional free cooling systems may suffer from inconsistent cooling output due to the fluctuation in external air temperature and/or the fluctuation in cooling load temperature. That is, conventional free cooling systems may lack a self-regulating mechanism to adjust to external condition changes and/or internal condition changes. As such, conventional free cooling systems may become unreliable in situations where the cooling demand and cooling supply varies in time.

Furthermore, conventional free cooling systems may suffer from a low duty cycle when atmospheric temperatures drop below the melting point of the cooling fluid, and they may have narrow operation margins when the external air temperatures begin to rise. As such, conventional free cooling systems may only operate for a relatively short period of time during a year.

Thus, there is a need for an independent free cooling system with improved functionalities and qualities.

SUMMARY

The present invention may provide an independent free cooling system that may operate without the aid of a chiller device. The independent free cooling system may sense a pre-loading temperature and a post-loading temperature of a first cooling fluid as well as a pre-cooling temperature and a post-cooling temperature of a second cooling fluid. In responding any detectable change in the pre-loading, post-loading, pre-cooling, and/or post loading temperatures, the independent free cooling system may adjust a first flow rate of the first cooling fluid and a second flow rate of the second cooling fluid. Hence, the independent free cooling system may provide a self-regulated, cost efficient and reliable solution to commercial and industrial cooling.

In one embodiment, the present invention may provide a free cooling system, which may include first and second conduits configured to carry first and second fluids respectively, the first fluid is configured to circulate within the first conduit, the second fluid is configured to circulate within the second conduit, a cooling load engages the first conduit, and is configured to transfer heat to the first fluid, thereby causing the first fluid to have a post-loading temperature, a free cooling device engages the second conduit, and is configured to transfer heat from the second fluid to atmospheric air, thereby causing the second fluid to have a post-cooling temperature, a heat exchanger engages the first and second conduits, and is configured to facilitate a heat exchange between the first and second fluids of the first and second conduits, thereby causing the first fluid to have a pre-loading temperature and the second fluid to have a pre-cooling temperature, and a fluid flow control device is coupled to the first and second conduits, and is configured to control a first flow rate of the first fluid and a second flow rate of the second fluid, such that the post-cooling temperature is less than the pre-loading temperature by at least a predefined temperature.

In another embodiment, the present invention may provide a free cooling system, which may include a first conduit having first, second, third, and fourth sections, and configured to carry a first fluid, the first, second, third, and fourth sections forming a first closed loop, a second conduit having first, second, third, and fourth sections, and configured to carry a second fluid, the first, second, third, and fourth sections forming a first closed loop, a cooling load engaging the first section of the first conduit, and configured to transfer heat to the first fluid within the first section of the first conduit, thereby causing the first fluid within the second section of the first conduit to have a post-loading temperature, a free cooling device engaging the first section of the second conduit, and configured to transfer heat from the second fluid within the first section of the second conduit to atmospheric air, thereby causing the second fluid within the second section of the second conduit to have a post-cooling temperature, a heat exchanger engaging the third sections of the first and second conduits, and configured to facilitate a heat exchange between the first and second fluids within the third sections of the first and second conduits, thereby causing the first fluid within the fourth section of the first conduit to have a pre-loading temperature and the second fluid within the fourth section of the second conduit to have a pre-cooling temperature, and a fluid flow control device coupled to the first and second conduits, and configured to control a first flow rate of the first fluid and a second flow rate of the second fluid, such that the post-cooling temperature is less than the pre-loading temperature by at least a predefined temperature.

In yet another embodiment, the present invention may provide a method for operating a free cooling system, which may include the steps of transferring heat from a cooling load to a first fluid carried by a first conduit, thereby causing the first fluid to have a post-loading temperature, transferring heat from a second fluid carried by a second conduit to atmospheric air by using a free cooling device, thereby causing the second fluid to have a post-cooling temperature, exchanging heat between the first fluid and the second fluid by using a heat exchanger, thereby causing the first fluid to have a pre-loading temperature and the second fluid to have a pre-cooling temperature, and controlling a first flow rate of the first fluid within the first conduit and a second flow rate of the second fluid within the second conduit by using a fluid flow control device, such that the post-cooling temperature is less than the pre-loading temperature by at least a predefined temperature.

BRIEF DESCRIPTION OF THE DRAWINGS

Other systems, methods, features, and advantages of the present invention will be or will become apparent to one with skill in the art upon examination of the following figures and detailed description. Hereinafter, the term "free cooling system" may be used for describing various independent free cooling systems of the present invention. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Apparatus, systems and methods that implement the embodiment of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between reference elements. In addition, the first digit of each reference number indicates the figure in which the element first appears.

Figure 1:
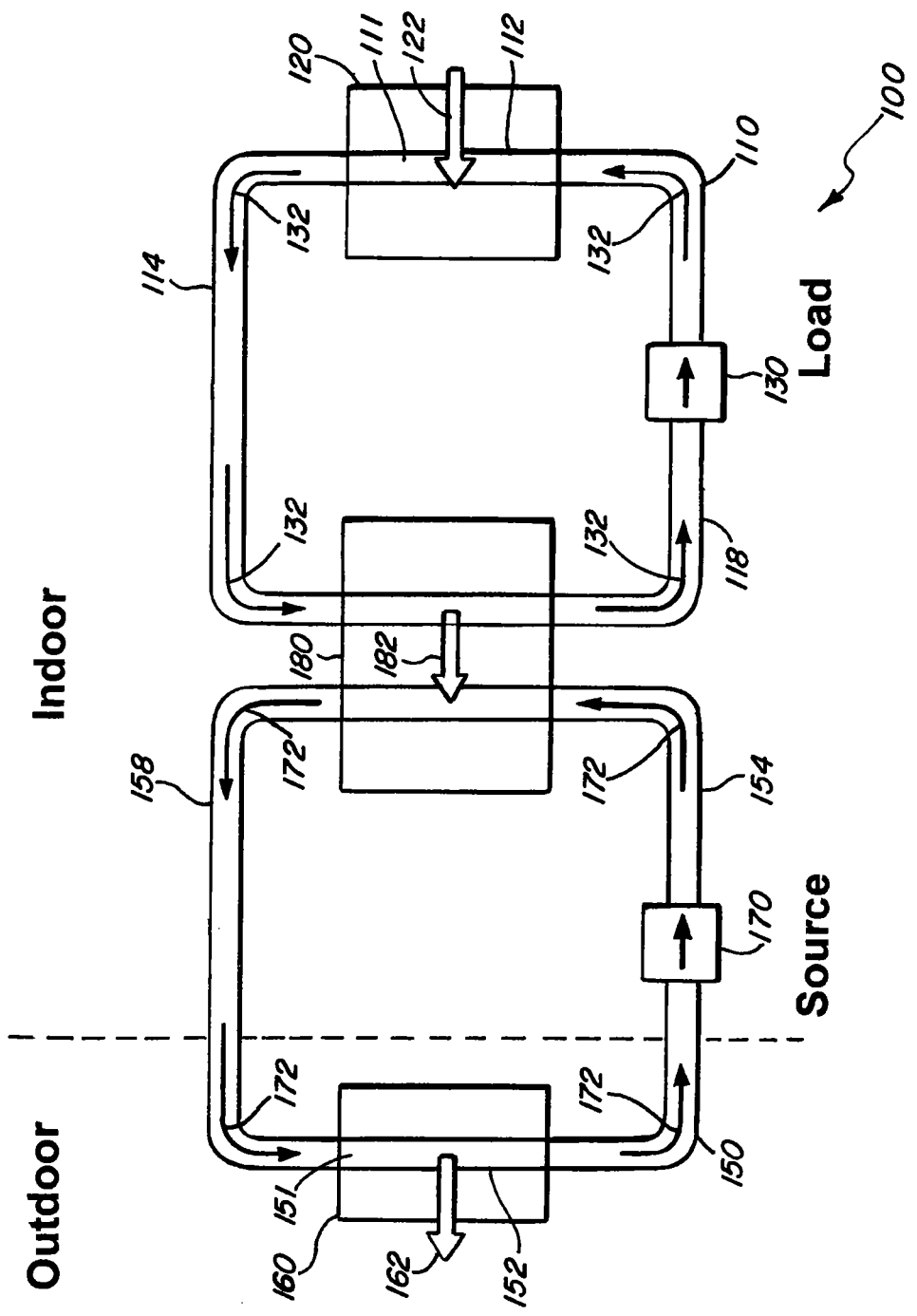
FIG. 1 shows a schematic view of a free cooling system according to an embodiment of the present invention.

In FIG. 1, a schematic view of a free cooling system 100 is shown according to an embodiment of the present invention. Generally, the free cooling system 100 may include a first conduit 110, a second conduit 150, a cooling load 120, a heat exchanger 180, a free cooling device 160, a first fluid flow control device 130, and a second fluid flow control device 170.

The first conduit 110 may be used for carrying a first fluid 111, and the second conduit 150 may be used for carrying a second fluid 151. From a high level standpoint, the first conduit 110 may be part of a heat absorption (load) system for absorbing heat from a cooling load 120, while the second conduit 150 may be part of a heat dissipation (source) system for dissipating the heat absorbed from the cooling load 120 to atmospheric air via the free cooling device 160.

The first conduit 110 may have a first section 112, a second section 114, a third section 116, and a fourth section 118. In one embodiment, the first, second, third, and fourth sections 112, 114, 116, and 118 may be combined to form a first (heat absorption) closed loop within which the first fluid 111 may circulate. For example, the first fluid 111 may flow from the first section 112 to the second section 114, from the second section 114 to the third section 116, from the third section 116 to the fourth section 118, and from the fourth section 118 back to the first section 112 to complete a closed loop. In another embodiment, the first conduit 110 may include one or more additional sections (not shown), which may be positioned among the first, second, third, and fourth sections 112, 114, 116, and 118 to form one or more closed loops.

The second conduit 150 may have a first section 152, a second section 154, a third section 156, and a fourth section 158. In one embodiment, the first, second, third, and fourth sections 152, 154, 156, and 158 may be combined to form a second (heat dissipation) closed loop within which the second fluid 151 may circulate. For example, the second fluid 151 may flow from the first section 152 to the second section 154, from the second section 154 to the third section 156, from the third section 156 to the fourth section 158, and from the fourth section 158 back to the first section 152 to complete a closed loop. In another embodiment, the first conduit 150 may include one or more additional sections (not shown), which may be positioned among the first, second, third, and fourth sections 152, 154, 156, and 158 to form one or more closed loops.

As shown in FIG. 1A, the cooling load 120 may engage or contact the first section 112 of the first conduit 110. Generally, the cooling load 120 may include heat generating components of one or more operating machineries. It is desirable to remove an excessive heat 122 of the cooling load 120 such that the machineries may operate properly. In one embodiment, the cooling load 120 may have a compartment for receiving the first section 112 of the first conduit 110. In another embodiment, the first section 112 may be integrated into the cooling load 120.

The cooling load 120 may transfer the excessive heat 122 to the first fluid 111 within the first section 112 of the first conduit 110. The amount of excessive heat 122 being transferred to the first fluid 111 may depend on a pre-loading temperature of the first fluid 111 before it enters the first section 112 and an operating temperature of the cooling load 120. If the difference between the operating temperature of cooling load 120 and the pre-loading temperature of the first fluid 111 is large, than a large amount of excessive heat 122 may be transferred from the cooling load 120 to the first fluid 111. Otherwise, only a small amount of excessive heat 122 may be transferred to the first fluid 111.

In order to have a consistent and efficient heat transfer between the cooling load 120 and the first fluid 111, the first fluid 111 may have a stable and well regulated pre-loading temperature, and that the pre-loading temperature be lower than the operating temperature of the cooling load 120 by a stable margin. Generally, the pre-loading temperature may be the temperature of the first fluid 111 within the fourth section 118 of the first conduit 110. More specifically, the pre-loading temperature may be the temperature of the first fluid 111 right before it receives the excessive heat 122 from the cooling load 120.

Depending on the operating temperature of the cooling load 120, the pre-cooling temperature may be regulated by the free cooling system 100 at various temperature ranges. In one embodiment, for example, the pre-cooling temperature may be regulated at about 5° C. with a +/−1° C. margin. In another embodiment, for example, the pre-cooling temperature may be regulated at about 8° C. with a +/−2° C. margin.

In yet another embodiment, for example, the pre-cooling temperature may be regulated at about 15° C. with a +/−5° C. margin.

After the cooling load 120 transfers the excessive heat 122 to the first fluid 111, the first fluid 111 may be circulated to the second section 114 of the first conduit 110, and it may have a post-loading temperature, which may be higher than the pre-loading temperature. Generally, if the first fluid 111 circulates at a lower rate within the first section 112, it may have more time in absorbing the excessive heat 122 from the cooling load 120.

Therefore, it may be desirable to lower the flow rate of the first fluid 111 when the first fluid 111 may need more time to absorb the excessive heat 122 from the cooling load 120. For example, the first fluid 111 may need more time to absorb the excessive heat 122 from the cooling load 120 when the cooling load 120 has a high operating temperature. For another example, the first fluid 111 may need more time to absorb the excessive heat 122 from the cooling load 120 when the difference between the post-loading temperature and the pre-loading temperature is decreasing.

To materialize the relationship between the first fluid 111 flow rate and the transfer of excessive heat 122, the free cooling system 100 may regulate the transfer of excessive heat 122 by utilizing the first fluid flow control device 130 to control a first flow rate 132 of the first fluid 111. Generally, the first fluid flow control device 130 may increase the first flow rate 132 when the cooling load 120 requires less time to transfer the excessive heat 122, and it may decrease the first flow rate 132 when the cooling load 120 requires more time to transfer the excessive heat 122.

In one embodiment, for example, the first fluid flow control device 130 may adjust the first flow rate 132 based on the pre-loading temperature of the first fluid 111 within the fourth section 118 of the first conduit 110. In another embodiment, for example, the first fluid flow control device 130 may adjust the first flow rate 132 based on a difference between the post-loading temperature of the first fluid 111 within the second section 114 and the pre-loading temperature of the first fluid 111 within the fourth section 118 (i.e. the loading margin). In yet another embodiment, for example, the first fluid flow control device 130 may reduce the first flow rate 132 when the loading margin is decreasing, and it may increase the first flow rate 132 when the loading margin is increasing.

Generally, the first fluid 111 may be a fluid with a boiling point that may be higher than the operating temperature of the cooling load 120. Depending on the range of operating temperatures, the first fluid 111 may include one or more heat conducting molecules. For example, the first fluid 111 may include water, and/or other coolant that may be suitable for absorbing heat from the cooling load 120.

After leaving the second section 114, the first fluid 111 may enter the third section 116 of the first conduit 110, which may be engaged by the heat exchanger 180 according to an embodiment of the present invention. The heat exchanger 180 may be configured to facilitate a heat exchange 182 between the first fluid 111 of the first conduit 110 and the second fluid 151 of the second conduit 150. Particularly, the heat exchanger 180 may contact the third sections 116 and 156 of the first and second conduits 110 and 150 respectively, thereby allowing the temperature of the first fluid 111 within the first conduit 110 to reach a thermal equilibrium with the second fluid 151 within the second conduit 150.

Before the heat exchange 182 takes place, the second fluid 151 may have a post-cooling temperature, which may be substantially lower than the post-loading temperature. In one embodiment, for example, the post-cooling temperature may be regulated by the free cooling system 100, such that it may be lower than the post-loading temperature by at least about 3° C. In another embodiment, for example, the post-cooling temperature may be regulated by the free cooling system 100, such that it may be lower than the post loading temperature by at least about 6° C. In yet another embodiment, for example, the post-cooling temperature may be regulated by the free cooling system 100, such that it may be lower than the post-loading temperature by at least about 12° C.

In an ideal situation, the heat exchanger 180 may have heat gain from the surrounding environment (background heat). As such, the first and second fluids 111 and 151 may attain the same temperature after the heat exchange 182. However, background heat may be inevitable in some situations, such that the first and second fluids 111 and 151 may attain different temperatures after the heat exchange 182. For example, the pre-loading temperature attained by the first fluid 111 may be higher than the pre-cooling temperature attained by the second fluid 151. To address this matter, the free cooling system 100 may take into account the asymmetry of the heat exchange 182 when it adjusts the post-cooling temperature. Particularly, the free cooling system 100 may include a feedback mechanism to ensure that the pre-loading temperature may be sufficiently low for absorbing the excessive heat 122 from the cooling load 120.

From a high level standpoint, the heat exchanger 180 may function as an inter-system device which may transfer the heat from the heat absorption (load) system to the heat dissipation (source) system. Although FIG. 1 shows that the heat exchange 182 takes place between the third sections 116 and 156 of the first and second conduits 110 and 150, the heat exchange 182 may take place between other sections of the first and second conduits 110 and 150 as well. For example, the heat exchange 182 may take place between the second section 114 of the first conduit 110 and the third section 156 of the second conduit 150.

Figure 4:
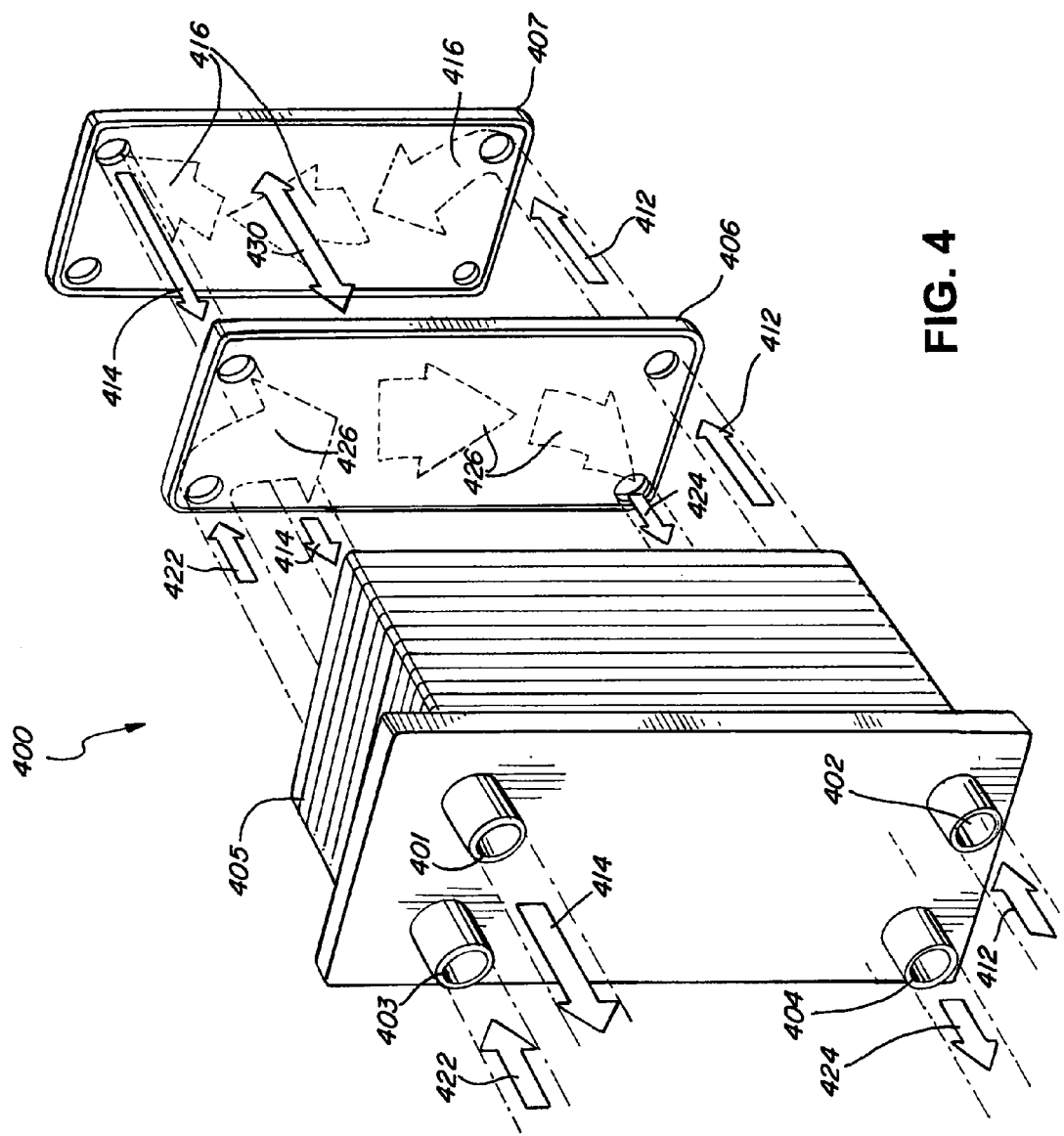
FIG. 4 shows an exploded view of a heat exchanger according to an embodiment of the present invention.

The heat exchanger 180 may be a device that may facilitate the heat exchange 182 between the first and second fluids 111 and 151. In one embodiment, for example, the heat exchanger 180 may be a plate-and-frame (PF) heat exchanger 400 as shown in FIG. 4. Generally, the PF heat exchanger 400 may include four ports 401, 402, 403, and 404, and a plurality of heat exchange plates 405. More specifically, the port 402 may receive a pre-exchange first fluid 412, the port 403 may receive a pre-exchange second fluid 422, the port 401 may output a post-exchange first fluid 414, and the port 404 may output a post-exchange second fluid 424.

After the pre-exchange first fluid 412 enters the PF heat exchanger 400, it may be delivered to several heat exchange plates 405, such as the heat exchange plate 407. At about the same time, the pre-exchange second fluid 422 may be delivered to several heat exchange plates 405 as well, such as the heat exchange plate 406. Accordingly, a heat exchange 460 may take place when the pre-exchange first fluid 412 travels across a heat exchanging surface 416 of the heat exchange plate 406, and when the pre-exchange second fluid 422 travels across a heat exchanging surface 426 of the heat exchange plate 406. After the heat exchange 460 takes place, the pre-exchange first fluid 412 may become the post-exchange first fluid 414, and the pre-exchange second fluid 422 may become the post-exchange second fluid 424. In order to minimize the effect of background heat, more heat exchange plates 405 may be added to the heat exchanger 400 according to an embodiment of the present invention.

Referring again to FIG. 1, the free cooling system 100 may adjust the first and second flow rates 132 and 172 of the first and second fluids 111 and 151 to increase the efficiency of the heat exchange 182. In one embodiment, for example, the free cooling system 100 may adjust the first flow rate 132 to allow the first fluid 111 more time to release the heat when the heat exchange 182 takes place. In another embodiment, for example, the free cooling system 100 may adjust the second flow rate 172 to limit the exposure of the second fluid 151 to the background heat when the heat exchange 182 takes place. In yet another embodiment, for example, the free cooling system 100 may simultaneously increase the second flow rate 172 of the second fluid 151 and reduce the first flow rate 132 of the first fluid 111, such that the first fluid 111 may have more time to release the heat while the second fluid 151 may be less likely to absorb the background heat. Advantageously, the free cooling system 100 may allow the heat exchanger 180 to operate efficiently under a wide range of background heat.

In order to regulate the pre-loading, post-loading, pre-cooling, and/or post cooling temperatures, the free cooling system 100 may use a fluid flow control device to control the first and second flow rates 132 and 172 of the first and second fluids 111 and 151 respectively. The fluid flow control device may be a single device, which may be coupled to both the first and second conduits 110 and 150. Alternatively, the fluid flow control device may include the first and second fluid flow control devices 170 and 130. More specifically, the first fluid flow control device 130 may be coupled to the first, second, third, and/or fourth sections 112, 114, 116, and/or 118 of the first conduit 110 for adjusting the first flow rate 132 of the first fluid 111, while the second fluid flow control device 170 may be coupled to the first, second, third, and/or fourth sections 152, 154, 156, and/or 158 of the second conduit 150 for adjusting the second flow rate 172 of the second fluid 151.

The settings and functionalities of the first and second fluid flow control devices 130 and 170 may be manually adjusted. Alternatively, the first and second fluid flow control devices 130 and 170 may automatically adjust the first and second flow rates 132 and 172 based on one or more detectable parameters.

Generally, the detectable parameters may indicate the efficiency of the heat exchange 182 and/or the overall performance of the free cooling system 100. Particularly, the detectable parameters may include, but is not limited to, the pre-loading temperature, the post-loading temperature, the pre-cooling temperature, the post-cooling temperature, the current first flow rate, the current second flow rate, the operating temperature of the cooling load, the indoor temperature, the outdoor temperature, and/or the number of heat exchange plates being used in the heat exchanger 180.

In order to monitor and update the values of the detectable parameters, the free cooling system 100 may include one or more temperature sensing devices, which may be coupled to the cooling load 120, the first conduit 110, the heat exchanger 180, the second conduit 150, and/or the free cooling device 160. Alternatively, the free cooling system 100 may incorporate the temperature sensing devices to the first and second fluid flow control devices 130 and 170.

After the heat exchange 182 takes place, the second fluid 151 may attain the pre-cooling temperature before entering the fourth section 158 of the second conduit 150. The second fluid 151 may retain the pre-cooling temperature while travelling along the fourth section 158 and before entering the first section 152 of the second conduit 150, which may be coupled to the free cooling device 160. In one embodiment, the free cooling device 160 may contact the first section 152 of the second conduit 150 without infiltrating thereof. In another embodiment, the free cooling device 160 may allow atmospheric air to contact the stream of the second fluid 151 within the first section 152 of the second conduit 150.

Generally, the free cooling device 160 may be a device that utilizes low temperature external (atmospheric) air to cool down the second fluid 151. Because the free cooling device 160 may extract heat from the second fluid 151 without using any coolant or involving any compression process, the free cooling device 160 may require very little energy to operate. As such, the free cooling device 160 may provide an environmental friendly and cost efficient solution to industrial or commercial cooling system.

Figure 3A:
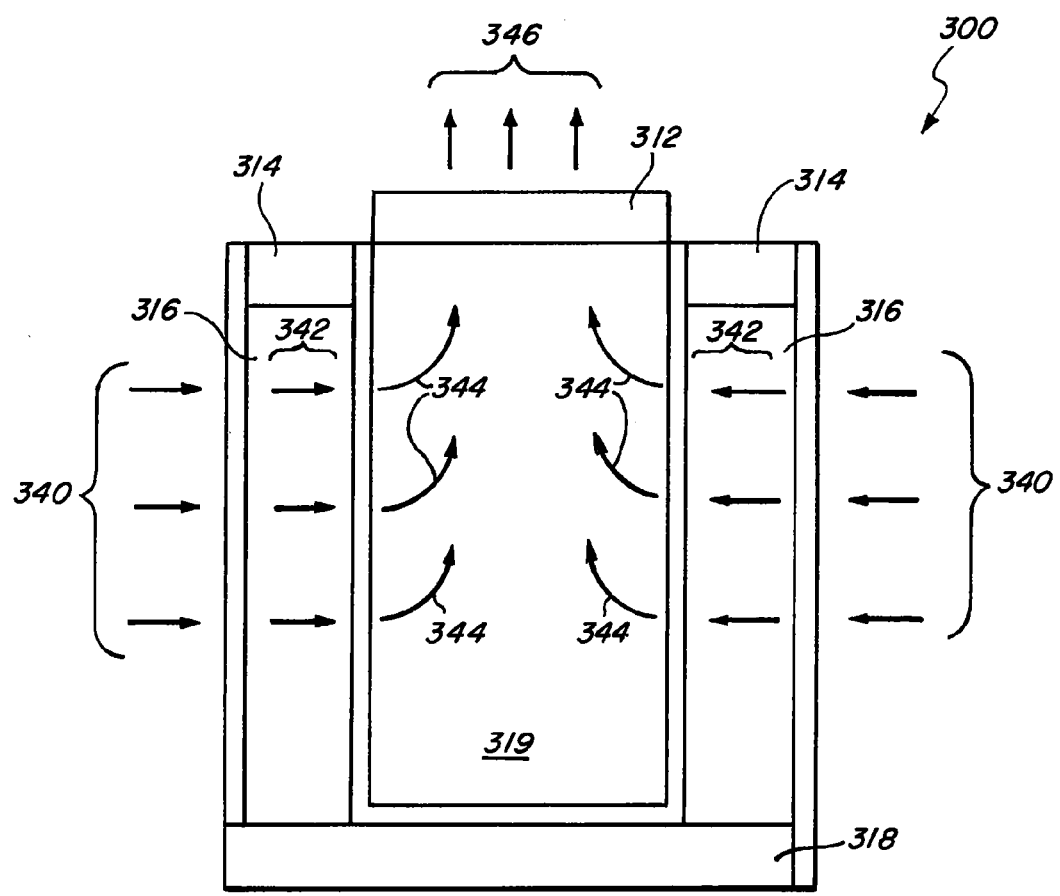
FIG. 3A shows a side view of a free cooling tower circulating atmospheric air according to an embodiment of the present invention.

In one embodiment, for example, the free cooling device 160 may be implemented by a free cooling tower 300 as show in FIG. 3A. Generally, the free cooling tower 300 may include a fan 312, one or more distribution basins 314, one or more cooling channels 316, a collecting basin 318, and a ventilation chamber 319. Initially, the cooling tower 300 may be powered on without receiving any second fluid 151. First, the fan 312 may create a convection current of air, which may draw the external (atmospheric) air 340 to enter the free cooling tower 300 from the side of the cooling channels 316. After entering the free cooling tower 300, the outside air 340 may form a cooling air stream 342, which may travel across the cooling channels 316. The cooling air stream 342 may leave the cooling channel 316 to form a convection stream 344 within the ventilation chamber 319. Next, the convection stream 345 may become the ventilated air 346 when it leaves the free cooling tower 300.

Figure 3B:
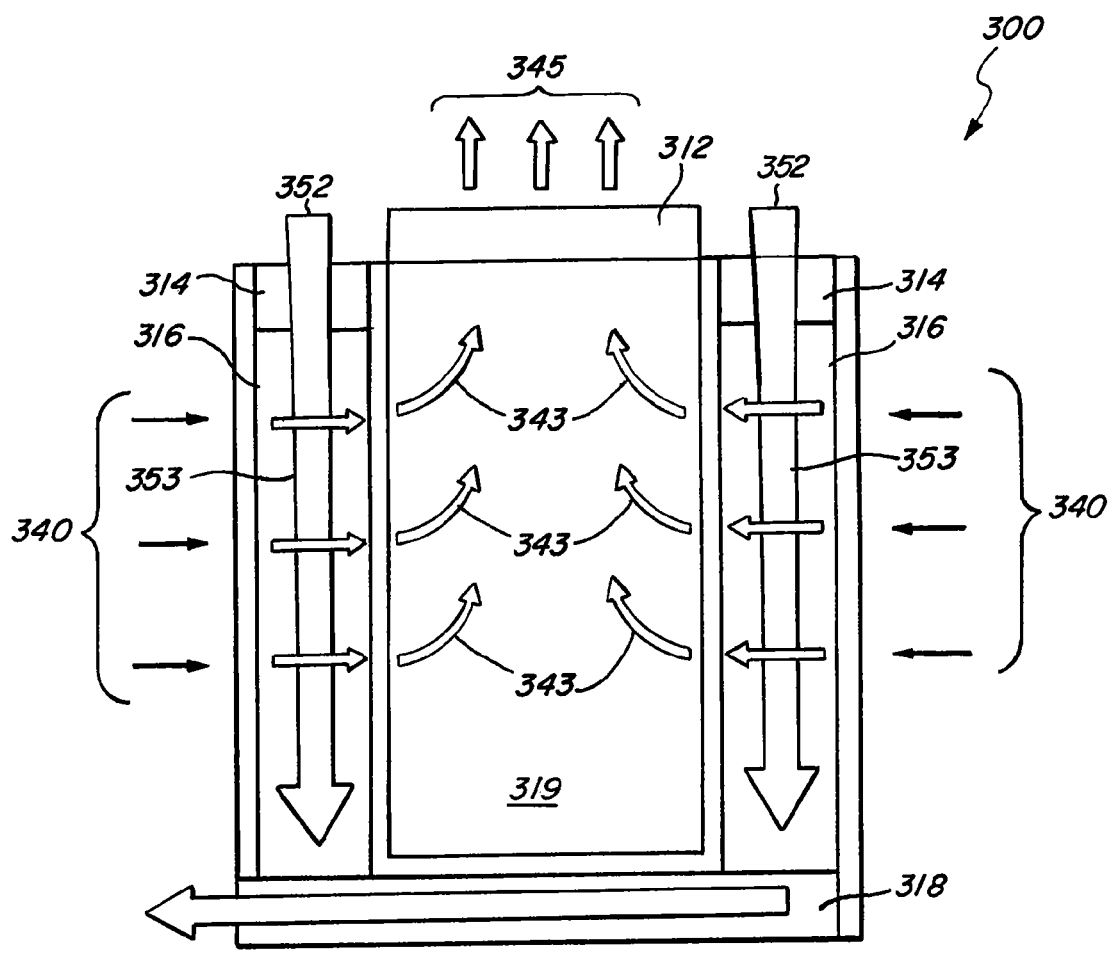
FIG. 3B shows a side view of the free cooling tower cooling down a stream of fluid according to an embodiment of the present invention.

As shown in FIG. 3B, the free cooling tower 300 may be used for cooling down one or more streams of second fluid 352. The streams of second fluid 352 may enter the free cooling tower 300 via the distribution basins 314, which may deliver the streams of second fluid 352 to the cooling channels 316. The cooling channels 316 may spread the streams of second fluid 352 into various tiers 353, so that the total surface area of the streams of second fluid 352 may be increased. As the tiers of second fluid 353 travels along the cooling channels 316, they may be contacted by the cooling air stream 342. As a result, some molecules of the tiers of second fluid 353 may transfer heat to the cooling air stream 342, or alternatively, they may absorb heat from adjacent molecules and evaporate into the cooling air stream 342 to form vapor stream 343. Because of the convection current created by the fan 312, the vapor stream 343 may travel from the cooling channel 316 to the ventilation chamber 319. Finally, the vapor stream 343 may then be sucked out of free cooling tower 300 to form the ventilated vapor 345. After travelling through the cooling channel 316, the second fluid 151 may be collected at the collection basin 318.

Referring again to FIG. 1, the second fluid 151 may have the post-cooling temperature after it dissipates a secondary heat 162 to the atmospheric air via the free cooling device 160. The secondary heat 162 may be a function of the excessive heat 122, which may be partially transferred from the first fluid 111 to the second fluid 151 via the heat exchanger 180. Generally, the post-cooling temperature may be higher than the atmospheric temperature by a free cooling efficiency margin, which may depend on a few factors, such as the atmospheric temperature, the pre-cooling temperature and the amount of time the second fluid 151 may be exposed to the atmospheric air (a.k.a. the exposure time). For example, the free cooling efficiency margin may increase when the atmospheric temperature decreases. For another example, the free cooling efficiency margin may increase when the pre-cooling temperature increases. For another example, the free cooling efficiency margin may decrease when the exposure time decreases.

Because the atmospheric temperature may fluctuate during operation of the free cooling system 100, the post-cooling temperature may also fluctuate even when the free cooling efficiency margin remains constant. Therefore, it is desirable to have a stable and well regulated post-cooling temperature, so that the cooling load 120 may operate under a consistent temperature range.

To compensate or counter the fluctuation in atmospheric temperature, the free cooling system 100 may regulate the post-cooling temperature by adjusting the second flow rate 172 of the second fluid 151. More specifically, the free cooling system 100 may adjust the second flow rate to increase or decrease the exposure time of the second fluid 151 to the atmospheric air. Consequentially, the exposure time may alter the free cooling efficiency margin, which may in return control the value of the post-cooling temperature.

In one embodiment, for example, the free cooling system 100 may decrease the second flow rate 172 when the atmospheric temperature increases, and it may increase the second flow rate 172 when the atmospheric temperature decreases. In another embodiment, for example, the free cooling system 100 may decrease the second flow rate 172 when the post-cooling temperature increases, and it may increase the second flow rate 172 when the post-cooling temperature decreases. In yet another embodiment, for example, the free cooling system 100 may decrease the second flow rate 172 when a difference between the pre-cooling and post-cooling temperatures (cooling margin) increases, and it may increase the second flow rate 172 when the difference between the pre-cooling and post-cooling temperatures (cooling margin) decreases.

Furthermore, the free cooling system 100 may take into account the conditions of the cooling load 120 when it regulates the post-cooling temperature. Because the pre-loading temperature may be a function of the post-loading temperature, which may be indicative of the operating temperature of the cooling load 120, the free cooling system 100 may be able to regulate the operating temperature of the cooling load 120 by maintaining a predefined inter-conduit margin between the post-cooling temperature and the pre-loading temperature. That is, the free cooling system 100 may control the first and second flow rates 132 and 172 in such a fashion that the post-cooling temperature is less than the pre-loading temperature by at least the predefined inter-conduit margin.

In one embodiment, for example, the free cooling system 100 may decrease the first flow rate 132 when the predefined inter-conduit margin decreases. In another embodiment, for example, the free cooling system 100 may increase the second flow rate 172 when the predefined inter-conduit margin decreases. In yet another embodiment, for example, the free cooling system 100 may simultaneously decrease the first flow rate 132 and increase the second flow rate 172 when the predefined inter-conduit margin decreases.

From a high level standpoint, the predefined inter-conduit margin may be used for regulating the overall performance of the free cooling system 100 by controlling the amount of heat exchange 182 that may take place between the first and second fluids 111 and 151. In one embodiment, the predefined inter-conduit margin may range, for example, from about 1° C. to about 10° C. In another embodiment, the predefined inter-conduit margin may range, for example, from about 1° C. to about 6° C. In yet another embodiment, the predefined inter-conduit margin may be approximately 3° C.

By utilizing the first and second flow rates 132 and 172 to regulate the post-cooling temperature and pre-loading temperature, the free cooling system 100 may be able to operate under a wide range of outdoor temperatures without the aid of any compression chiller device. Advantageously, the free cooling system 100 may provide a reliable and energy efficient cooling solution for commercial and/or industrial cooling.

Figure 2:
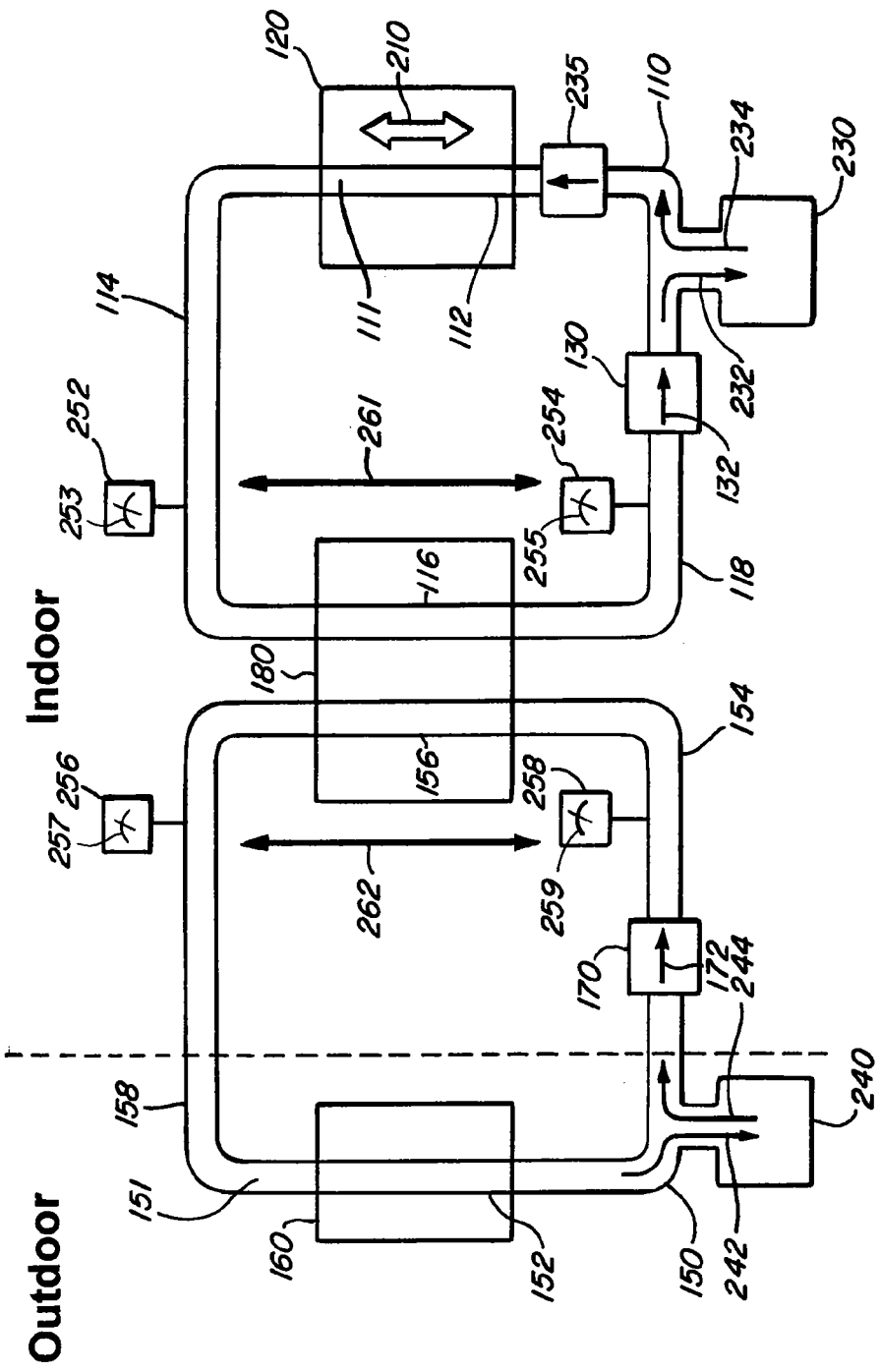
FIG. 2 shows a schematic view of a free cooling system with two storage tanks according to an embodiment of the present invention.

The discussion now turns to FIG. 2, which shows a schematic view of a free cooling system 200 with two storage tanks 240 and 230 according to an embodiment of the present invention. Generally, the free cooling system 200 may incorporate all the structural and functional features of the free cooling system 100. In addition, the free cooling system 200 may include a first storage tank (a.k.a. the thermal storage tank) 230, a second storage tank (a.k.a. the chiller condenser sump) 240, a third fluid flow control device 235, and four temperature sensing devices 252, 254, 256, and 258.

The first storage tank 230 may be connected to the fourth section 118 of the first conduit 110 for storing the first fluid 111 and for preserving the pre-loading temperature of the first fluid 111. The first storage tank 230 may receive the first fluid 111 at a first inflow rate 232, which may be controlled by the first fluid flow control device 130. Depending on the cooling demand from the cooling load 120, the first storage tank 230 may deliver the first fluid 111 at a first outflow rate 234, which may be controlled by the third fluid flow control device 235.

When the operating temperature of the cooling load 120 remains relatively stable, the first inflow rate 232 may be approximately the same as the first outflow rate 234. However, when the cooling load 120 has a sudden operating temperature fluctuation 210, the first inflow rate 232 may be different from the first outflow rate 234. For example, the first inflow rate 232 may be higher than the first outflow rate 234 when the cooling load 120 experiences a sudden drop in operating temperature. For another example, the first outflow rate 234 may be higher than the first inflow rate 232 when the cooling load 120 experiences a sudden rise in operating temperature.

The second storage tank 240 may be connected to the second section 154 of the second conduit 150 for storing the second fluid 151 and for preserving the post-cooling temperature of the second fluid 151. The second storage tank 240 may receive the second fluid 151 at a second inflow rate 242, which may be a function of the second flow rate 172 and the free fall velocity incurred by the second fluid 151 when it travels through the free cooling device 160. Depending on the rate of the heat exchange 182, the second storage tank 240 may deliver the second fluid 151 at a second outflow rate 244, which may be controlled by the fluid flow control device 170.

The free cooling system 200 may have two or more temperature sensing devices for sensing the temperatures of the first fluid 111 within the heat absorption (load) system. In one embodiment, for example, a first temperature sensing device 252 may be coupled to the second section 114 of the first conduit 110, and it may be used for sensing the post-loading temperature 253 of the first fluid 111. In another embodiment, for example, a second temperature sensing device 254 may be coupled to the fourth section 118 of the first conduit 110, and it may be used for sensing the pre-loading temperature 255 of the first fluid 111.

Moreover, the free cooling system 200 may have two or more temperature sensing devices for sensing the temperatures of the second fluid 151 within the heat dissipation (source) system. In one embodiment, for example, a third temperature sensing device 256 may be coupled to the fourth section 158 of the second conduit 150, and it may be used for sensing the pre-cooling temperature 257. In another embodiment, for example, a fourth temperature sensing device 258 may be coupled to the second section 152 of the second conduit 150, and it may be used for sensing the post-cooling temperature 259.

In real-time, the first, second, third, and fourth temperature sensing devices 252, 254, 256, and 258 may send the pre-loading, post-loading, pre-cooling, and post-cooling temperatures 253, 255, 257, and 259 to the first and second fluid flow control devices 130 and 170. As a result, the first and second fluid flow control devices 130 and 170 may make real time adjustment to the first and second flow rates 132 and 172. For example, the first fluid flow control device 130 may determine the first flow rate 132 based on a loading margin 261, while the second flow control device 170 may determine the second flow rate 172 based on a cooling margin 262. More specifically, the loading margin 261 may be determined by subtracting the pre-loading temperature 255 from the post-loading temperature 253, while the cooling margin 262 may be determined by subtracting the post-cooling temperature 259 from the pre-cooling temperature 257.

In one embodiment, the first fluid flow control device 130 may decrease the first flow rate 132 when the loading margin 261 is increasing, and it may increase the first flow rate 132 when the loading margin 261 is decreasing. In another embodiment, the second fluid flow control device 170 may increase the second flow rate 172 when the cooling margin 262 is decreasing, and it may decrease the second flow rate 172 when the cooling margin 262 is increasing. In yet another embodiment, the first and second fluid flow control devices 130 and 170 may simultaneously adjust the first and second flow rates 132 and 172 based on the loading margin 261 and the cooling margin 262.

Figure 5:
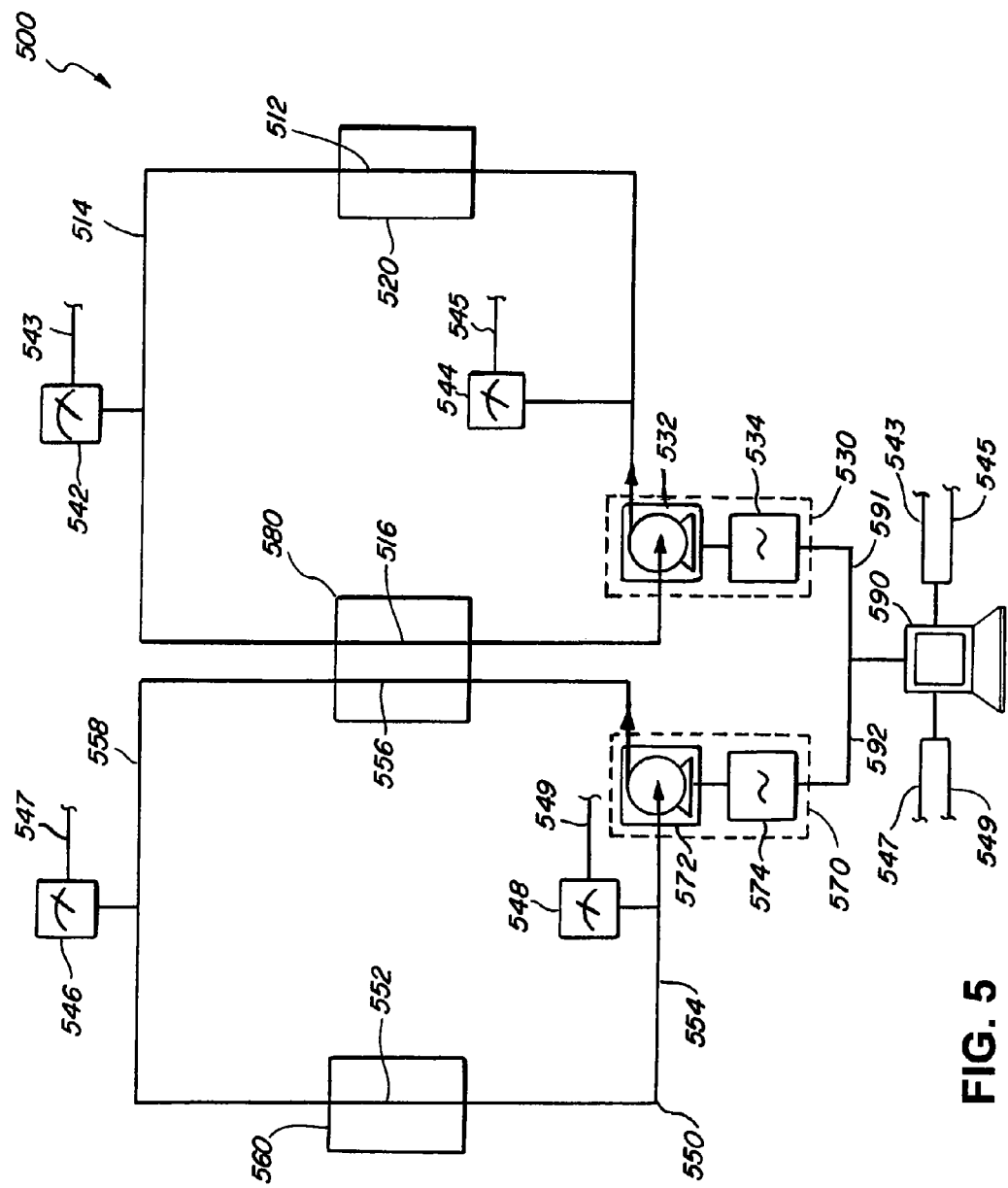
FIG. 5 shows a schematic view of an automated free cooling system according to an embodiment of the present invention.

The discussion now turns to an automated free cooling system 500, which is shown in FIG. 5 according to an embodiment of the present invention. The automated free cooling system 500 may be similar to the free cooling system 100. Generally, the automated free cooling system 500 may include a first conduit 510, a second conduit 550, a cooling load 520, a heat exchanger 580, a free cooling device 560, a first fluid flow control device 530, and a second fluid flow control device 570. The first conduit 510 may be used for carrying a first fluid, and it may be divided into the first, second, third, and fourth sections 512, 514, 516, and 518, which may form a first closed loop system. Similarly, the second conduit 550 may be used for carrying a second fluid, and it may also be divided into first, second, third, and fourth sections 552, 554, 556, and 558, which may form a second closed loop system.

The cooling load 520 may be coupled to the first section 512 of the first conduit 520, and it may transfer the excessive heat to the first fluid, thereby causing the first fluid to have a post-loading temperature. The heat exchanger 580 may be coupled to the third section 516 of the first conduit 510 and the third section 556 of the second conduit 550, and it may be used for facilitating the heat exchange between the first and second fluids without having the first and second fluids making any physical contact with each other. After the heat exchange, the first fluid may have a pre-loading temperature and the second fluid may have a pre-cooling temperature. The free cooling device 560 may be coupled to the first section 552 of the second conduit 550, and it may transfer the secondary heat from the second fluid to the atmospheric air, such that the second fluid may have a post-cooling temperature.

The automated free cooling system 500 may include four temperature sensing devices 542, 544, 546, and 548 for sensing the pre-loading, post-loading, pre-cooling, and post cooling temperatures. For example, a first temperature sensing device 542 may be coupled to the second section 514 of the first conduit 510, and it may be used for sensing the post-loading temperature of the first fluid. After sensing the post-loading temperature, the first temperature sensing device 542 may generate a post-loading temperature (POLT) signal 543, which may represent the sensed value of the post-loading temperature.

For another example, a second temperature sensing device 544 may be coupled to the fourth section 518 of the first conduit 510, and it may be used for sensing the pre-loading temperature of the first fluid. After sensing the pre-loading temperature, the second temperature sensing device 544 may generate a pre-loading temperature (PRLT) signal 545, which may represent the sensed value of the pre-loading temperature.

For another example, a third temperature sensing device 546 may be coupled to the fourth section 558 of the second conduit 550, and it may be used for sensing the pre-cooling temperature of the second fluid. After sensing the pre-cooling temperature, the third temperature sensing device 546 may generate a pre-cooling temperature (PRCT) signal 547, which may represent the sensed value of the pre-cooling temperature.

For yet another embodiment, for example, the fourth temperature sensing device 548 may be coupled to the second section 554 of the second conduit 550, and it may be used for sensing the post-cooling temperature of the second fluid. After sensing the post-cooling temperature, the fourth temperature sensing device 548 may generate a post-cooling temperature (POCS) signal 549, which may represent the sensed value of the post-cooling temperature.

Consequentially, a processor 590 may be used for receiving and processing the POLT signal 543, the PRLT signal 545, the PRCT signal 547, and the POCT signal 549. Generally, the processor 590 can be any computing device capable of receiving data, processing the received data, and outputting the processed data. For example, the processor 590 can be coupled to a display (not shown) and a memory (not shown). The processor 590 may be implemented using hardware, software, firmware, middleware, microcode, or any combination thereof. The processor 590 may be an Advanced RISC Machine (ARM), a computer, a controller, a digital signal processor (DSP), a microprocessor, circuitry, a processor chip, or any other device capable of processing data, and combination thereof.

Particularly, the processor 590 may generate a first flow rate signal 591 and a second flow rate signal 592 based on the POLT signal 543, the PRLT signal 545, the PRCT signal 547, and the POCT signal 549. The processor 590 may adopt one or more of the aforementioned algorithms and/or methods for determining the first and second flow rate signals 591 and 592. In one embodiment, for example, the processor 500 may generate the first flow rate signal 591 based on the PRLT signal 545, and it may generate the second flow rate signal 592 based on the POCT signal 549. In another embodiment, for another example, the processor 500 may generate the first flow rate signal 591 based on the loading margin between the POLT signal 543 and the PRLT signal 545, and it may generate the second flow rate signal 592 based on the cooling margin between the PRCT signal 547 and the POCT signal 549. In yet another embodiment, for example, the processor 590 may generate the first flow rate signal 591 based on the POLT signal 543, and it may generate the second flow rate signal 592 based on the PRCT signal 547.

As shown in FIG. 5, the first fluid flow control device 530 may include a first pump 532 and a first variable frequency drive (VFD) 534, while the second fluid flow control device 570 may include a second pump 572 and a second VFD 574.

In one embodiment, the first VFD 534 may be used for receiving the first flow rate signal 591 and for controlling the pumping speed of the first pump 532. Accordingly, the first flow rate of the first fluid may be controlled and adjusted by the first flow rate signal 591. In another embodiment, the second VFD 574 may be used for receiving the second flow rate signal 592 and for controlling the pumping speed of the first pump 572. Accordingly, the second flow rate of the second fluid may be controlled and adjusted by the second flow rate signal 592.

The automated free cooling system 500 may provide several improvements over other conventional free cooling systems, which may rely on a supplemental chiller device. For example, the automated free cooling system 500 may be self-regulated and self-adjusted, so that it may deliver consistent and reliable cooling solution under varying changing conditions, such as atmospheric temperature, cooling load operating temperature, and background temperature. In fact, certain embodiments of the present invention have been proven to save more than 700,000 KWh of power and $63,000 worth of electricity in a 6-month period when compared to the conventional chiller dependent free-cooling systems. Furthermore, because the automated free cooling system 500 may operate under narrow temperature margins, it may provide free cooling solution for a larger number of months per year when compared to conventional free cooling systems.

Figure 6:
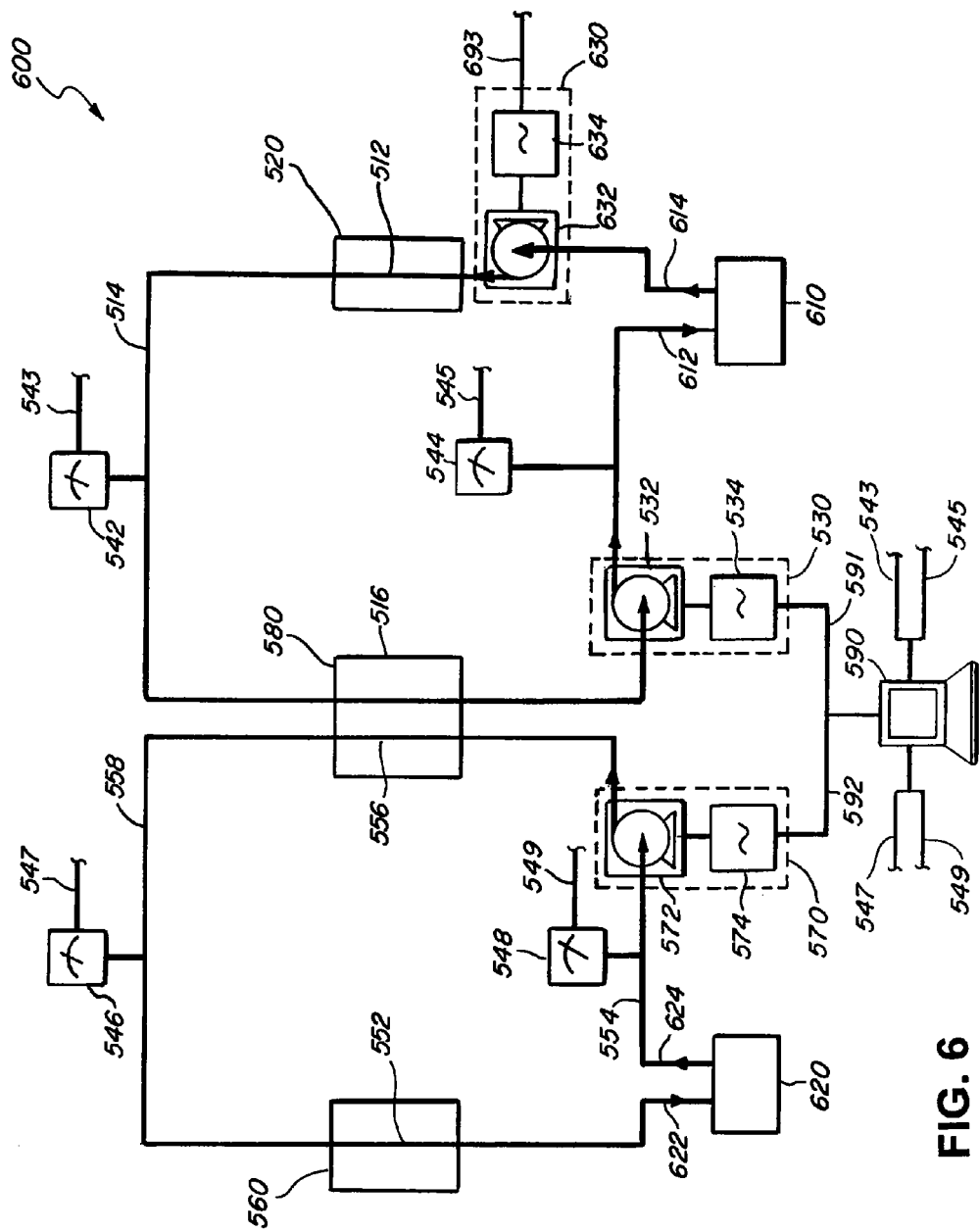
FIG. 6 shows a schematic view of an automated free cooling system with two storage tanks according to an embodiment of the present invention.

The discussion now turns to FIG. 6, which shows an automated free cooling system 600 with two storage tanks 610 and 620 according to an embodiment of the present invention. Generally, the automated free cooling system 600 may incorporate all the structural and functional features of the free cooling system 500. In addition, the free cooling system 600 may include a first storage tank (a.k.a. the thermal storage tank) 610, a second storage tank (a.k.a. the chiller condenser sump) 620, and a third fluid flow control device 630.

The first storage tank 610 may be connected to the fourth section 518 of the first conduit 510 for storing the first fluid and for preserving the pre-loading temperature of the first fluid. The first storage tank 610 may receive the first fluid at a first inflow rate 612, which may be controlled by the first fluid flow control device 530. Depending on the cooling demand from the cooling load 520, the first storage tank 610 may deliver the first fluid at a first outflow rate 614, which may be controlled by the third fluid flow control device 630.

When the operating temperature of the cooling load 520 remains relatively stable, the first inflow rate 612 may be approximately the same as the first outflow rate 614. However, when the cooling load 520 has a sudden operating temperature fluctuation, the first inflow rate 612 may be different from the first outflow rate 614. For example, the first inflow rate 612 may be higher than the first outflow rate 614 when the cooling load 520 experiences a sudden drop in operating temperature. For another example, the first outflow rate 614 may be higher than the first inflow rate 612 when the cooling load 520 experiences a sudden rise in operating temperature.

According to an embodiment of the present invention, the processor 590 may iteratively, continuously, randomly, and/or periodically monitor the post-loading temperature via the POLT signal 543, and it may generate a third flow rate signal 693 based on the POLT signal 543. The third fluid flow control device 630 may include a third pump 632 and a third VFD 634. After receiving the third flow rate signal 693 from the processor 590, the third VFD may control the pumping speed of the third pump 632. Accordingly, the first outflow rate 614 of the first tank 610 may be controlled and adjusted by the third flow rate signal 693.

The second storage tank 620 may be connected to the second section 554 of the second conduit 550 for storing the second fluid and for preserving the post-cooling temperature of the second fluid. The second storage tank 620 may receive the second fluid at a second inflow rate 622, which may be a function of the second flow rate and the free fall velocity incurred by the second fluid when it passes through the free cooling device 560. Depending on the rate of heat exchange, the second storage tank 620 may deliver the second fluid at a second outflow rate 624, which may be controlled by the second fluid flow control device 570.

Figure 7:
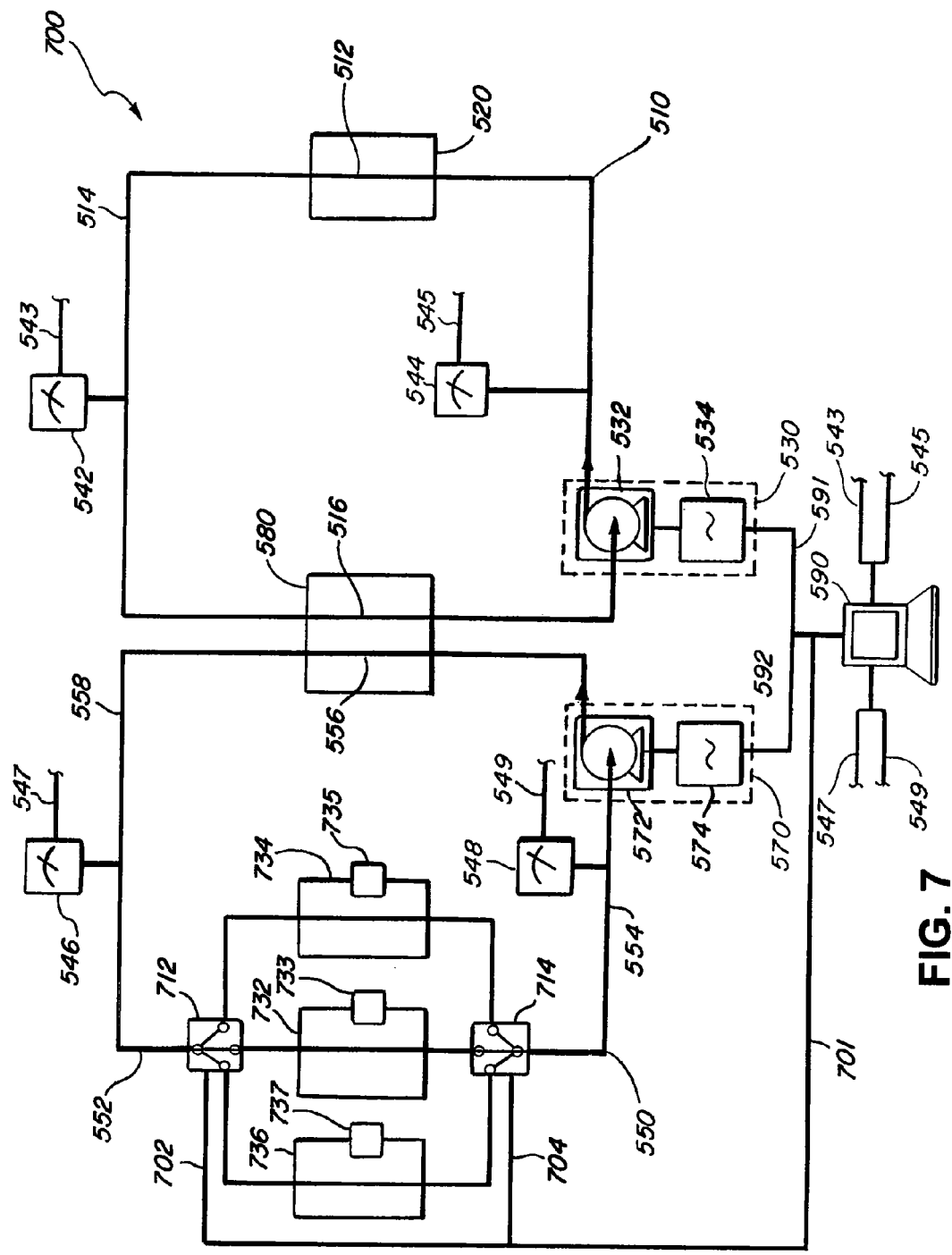
FIG. 7 shows a schematic view of an automated free cooling system with multiple free cooling towers according to an embodiment of the present invention.

FIG. 7 shows a schematic view of an automated free cooling system 700 with multiple free cooling towers 732, 734, and 736 according to an embodiment of the present invention. Generally, the automated free cooling system 700 may incorporate all the structural and functional features of the free cooling system 500. In addition, the free cooling device of the free cooling system 700 may include a first free cooling tower 732, a second free cooling tower 734, and a third cooling tower 736. Each of the first, second and third free cooling towers 732, 734, and 736 may incorporate the structural and functional features of the free cooling tower 300 as shown in FIGS. 3A and 3B.

From a high level standpoint, the multiple free cooling towers configuration may provide a number of improvements over the single free cooling tower configuration. For example, the multiple free cooling towers configuration may allow the free cooling system 700 to rotate among the first, second, and third towers 732, 734, and 736 when executing the free cooling process. Such rotation may be beneficial when one or more free cooling towers become inoperable due to a condition known as tower icing. For another example, the multiple free cooling towers configuration may allow the free cooling system 700 to expand the throughput of chilled second fluid in a relatively short period of time. Such throughput expansion may be beneficial when the cooling demand of the cooling load 520 suddenly increases and when adjusting the first and/or second flow rates are unlikely to immediately meet such increase in cooling demand.

The first free cooling tower 732 may include a first icing sensor 733 for sensing the icing condition thereof. When the icing condition of the first free cooling tower 732 reaches a predefined icing threshold, the first icing sensor 733 may generate a first icing signal to notify the processor 590. The second free cooling tower 734 may include a second icing sensor 735 for sensing the icing condition thereof. When the icing condition of the second free cooling tower 734 reaches the predefined icing threshold, the second icing sensor 735 may generate a second icing signal to notify the processor 590. In yet another embodiment, the third free cooling tower 734 may include a third icing sensor 737 for sensing the icing condition thereof. When the icing condition of the third free cooling tower 736 reaches the predefined icing threshold, the third icing sensor 737 may generate a third icing signal to notify the processor 590.

Generally, the predefined icing condition may be a thickness of an icing layer formed the cooling channels of the free cooling tower. Depending on the materials that compose the second fluid, the icing layer may begin to form at temperatures close to its melting point. For example, if water is used for forming the second fluid, the icing layer may begin to form at about 0° C. When the icing layer reaches a certain thickness, the free cooling tower may cease from performing because the icing layer may prevent the free flow of second fluid across its cooling channels.

To address the icing condition of a particular free cooling tower, the processor 590 may initiate a defrosting process by transmitting a defrosting signal to that particular free cooling tower via a connection link 701. Particularly, the processor 590 may control a free cooling inlet valve 712 by generating a free cooling inlet selection signal 702, and it may control a free cooling outlet valve 714 by generating a free cooling outlet selection signal 704. Accordingly, the processor 590 may select one or more free cooling towers to perform the free cooling task at a particular period of time. For example, the processor 590 may select only the first free cooling tower 732 to perform the free cooling task. For another example, the processor 590 may select the first and second free cooling towers 732 and 734 to perform the free cooling task. For yet another example, the processor 590 may select the first, second, and third free cooling tower 732, 734, and 736 to perform the free cooling task.

As an illustration, if the first free cooling tower 732 reaches the predefined icing condition, the processor 590 may instruct the free cooling inlet and outlet valves 712 and 714 to divert the second fluid away from the first free cooling tower 732 momentarily or until the cooling channels of the first free cooling tower 732 is substantially free of the icing condition. Accordingly, the processor 590 may instruct the second free cooling tower 734 to assume the free cooling task until the first free cooling tower 732 is ready to perform again.

While the first free cooling tower 732 is defrosting, the second free cooling tower 734 may also reach the predefined icing threshold before the first free cooling tower 732 is ready to perform. As such, the processor 590 may instruct the third free cooling tower 736 to assume the free cooling task until the first or second free cooling tower 732 or 734 is ready to perform again.

In order to defrost the cooling channels, the free cooling tower may stop the circulation of outside air by turning off the fan and simultaneously run a defrosting agent across its cooling channel. The automated free cooling system 700 may use the second fluid with the pre-cooling temperature as the defrosting agent in one embodiment. Alternatively, the automated free cooling system 700 may use water with room temperature as the defrosting agent in another embodiment.

Advantageously, the automated free cooling system 700 may substantially increase the duty cycle of the free cooling device by rotating among the free cooling towers 732, 734, and 736. In fact, certain embodiments of the present invention may achieve a 100% free cooling duty cycle even when the atmospheric temperature is below 0° C.

Figure 8:
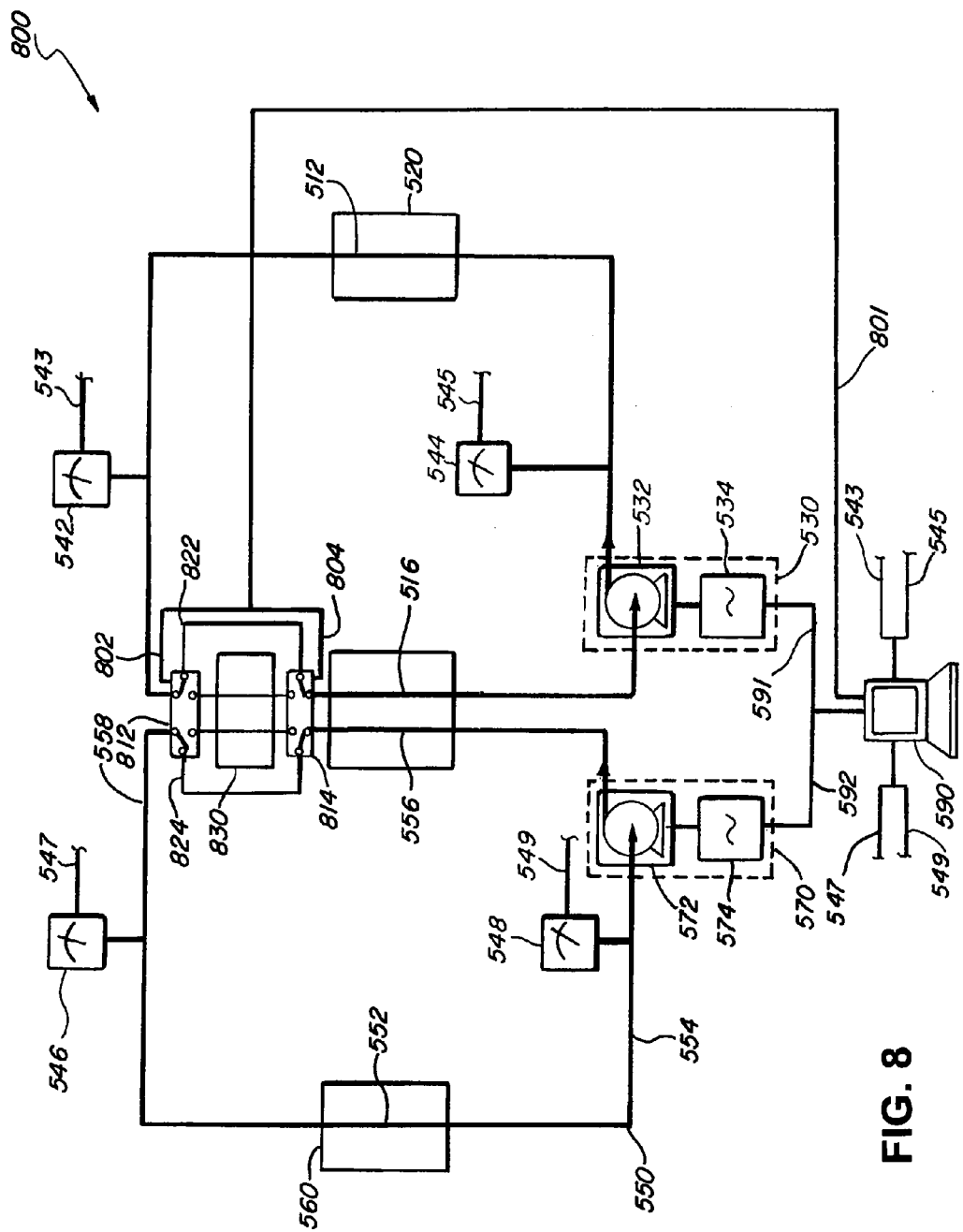
FIG. 8 shows a schematic view of an automated free cooling system with a back-up chiller according to an embodiment of the present invention.

The discussion now turns to FIG. 8, which shows a schematic view of an automated free cooling system 800 with a back-up chiller 830 according to an embodiment of the present invention. Generally, the automated free cooling system 800 may incorporate all the structural and functional features of the free cooling system 500. In addition, the automated free cooling system 800 may include a safety mechanism to handle a situation where the free cooling device 560 may momentarily be unable to meet the cooling demand of the cooling load 520.

Particularly, the processor 590 may initiate a back-up sequence when adjusting the first and second flow rates may have little effect in maintaining the predefined inter-conduit margin between the pre-loading temperature and the post-cooling temperature. At the beginning of the back-up sequence, the processor 590 may generate a chiller activation signal 801 to activate the back-up chiller 830. Next, the processor 590 may generate a first backup signal 802 to instruct a first bypass valve 812 to stop bypassing the back-up chiller 830, and it may generate a second backup signal 804 to instruct a second bypass valve 814 to stop bypassing the back-up chiller 830.

After receiving the first and second back-up signals 802 and 804, the first and second bypass valves 812 and 814 may momentarily stop the first fluid from flowing through a bypass section 822 of the first conduit 510, and they may momentarily stop the second fluid from flowing through a bypass section 824 of the second conduit 550. Accordingly, the back-up chiller 830 may be coupled to the third sections 516 and 556 of the first and second conduits 510 and 550 as shown in FIG. 8. Consequentially, the back-up chiller 830 may be used for providing back-up cooling source to help the free cooling device 560 meet the demand of the cooling load 520.

The processor 590 may iteratively, repeatedly, randomly, and/or periodically monitor the pre-loading temperature signal 545, the post-loading temperature signal 543, the pre-cooling temperature signal 547, and the post-cooling temperature signal 549 during the execution of the back-up sequence. As soon as the free cooling device 560 is able to meet the demand of the cooling load 520, the processor 590 may terminate the back-up sequence. Accordingly, the back-up chiller 830 may be deactivated, and the first and second bypass valves 812 and 814 may bypass the back-up chiller 830 to direct the first fluid to flow through the bypass section 822 and the second fluid to flow through the bypass section 824.

Because of the safety mechanism, the automated free cooling system 800 may have a high tolerance to sudden and momentary fluctuations in the atmospheric temperature and in the operating temperature of the cooling load 520.

Figure 9:
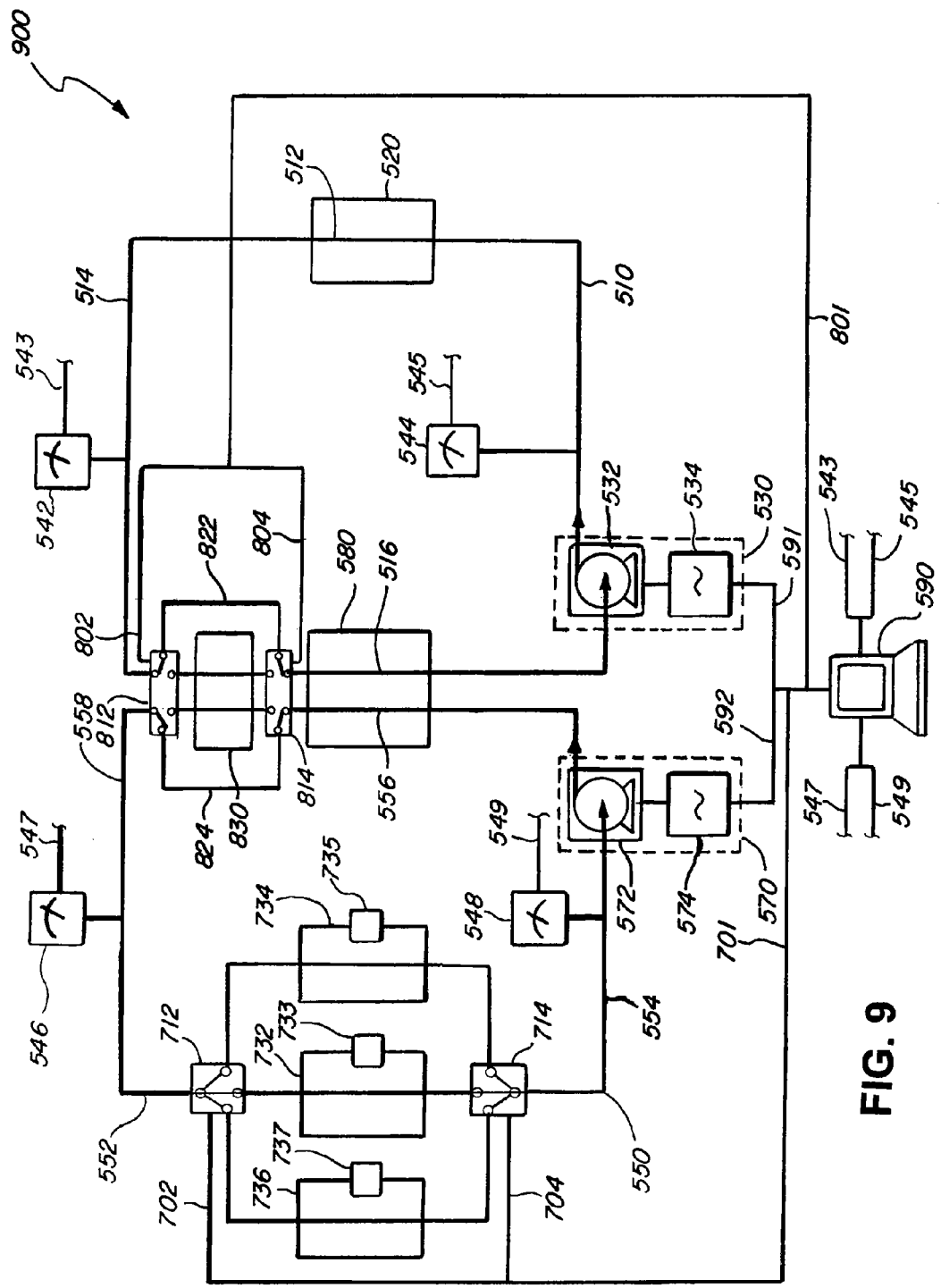
FIG. 9 shows a schematic view of an automated free cooling system with multiple free cooling towers and with the back up chiller according to an embodiment of the present invention.

The discussion now turns to FIG. 9, which shows a schematic view of an automated free cooling system 900 with multiple free cooling towers 732, 734, and 736 and with the back up chiller 830 according to an embodiment of the present invention. Generally, the automated free cooling system 900 may incorporate all the structural and functional features of the automated free cooling systems 500, 700 and 800.

For example, the automated free cooling system 900 may have an improved free cooling duty cycle due to the multiple free cooling towers configuration. For another example, the automated free cooling system 900 may have an adjustable free cooling throughput due to the selectable free cooling towers. For yet another example, the automated free cooling system 900 may have a safety mechanism to handle the situation where the demand of the cooling load 520 may momentarily exceed the combined cooling supply of the free cooling towers 732, 734, and 738.

Advantageously, the automated free cooling system 900 may be able to deliver high tolerance, flexible, environmental friendly, and cost efficient free cooling solution to commercial and/or industrial cooling.

Figure 10:
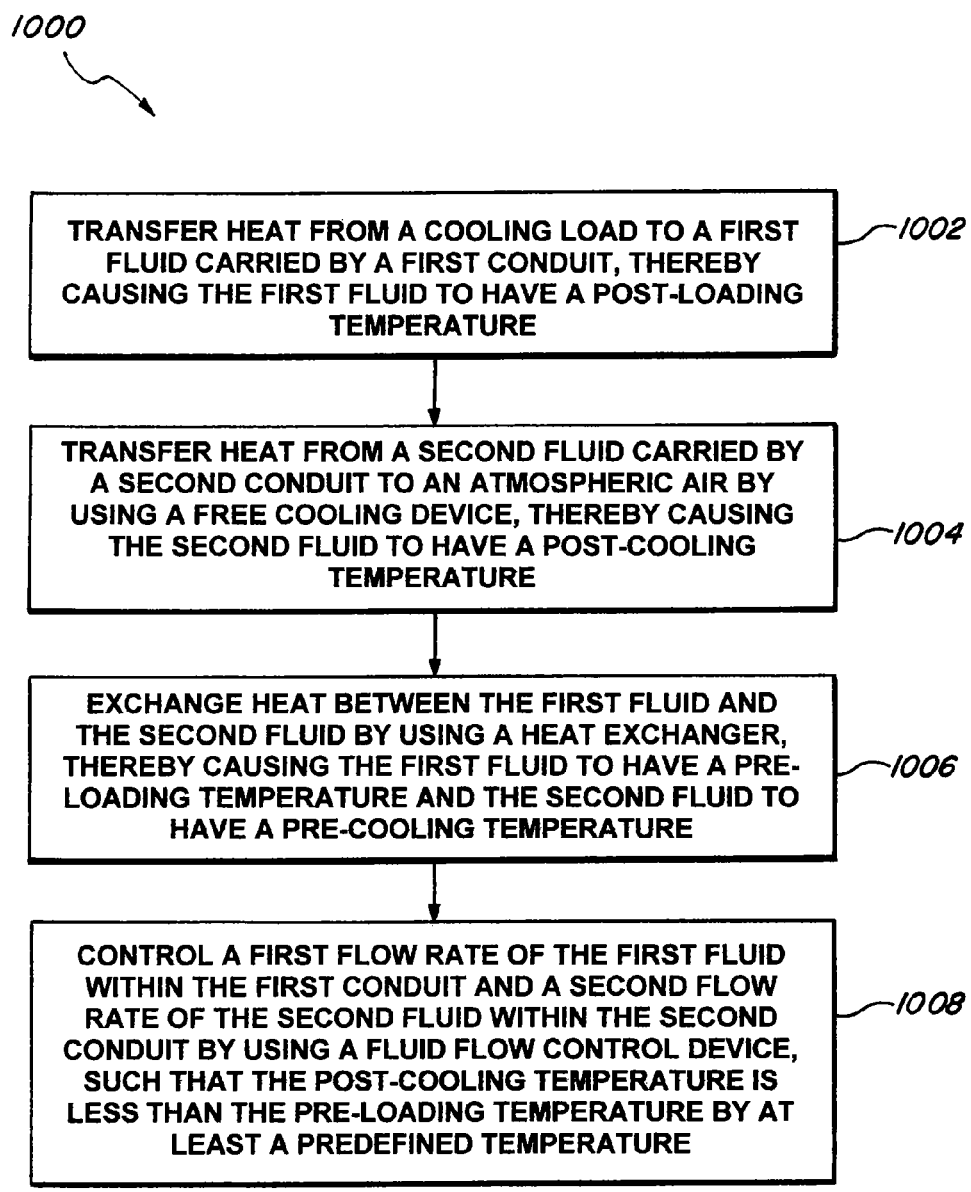
FIG. 10 shows a flow chart of a method for operating a free cooling system according to an embodiment of the present invention.

The discussion now turns to FIG. 10, which shows a flow chart of a method 1000 for operating the free cooling system according to an embodiment of the present invention. Generally, the free cooling system of the method 1000 may be one or more of the free cooling systems as discussed in FIGS. 1-9. More specifically, the free cooling system of the method 1000 may be any free cooling system which may operate independent of the aid of a chiller device. In step 1002, heat may be transferred from a cooling load to a first fluid carried by a first conduit, thereby causing the first fluid to have a post-loading temperature.

In step 1004, heat may be transferred from a second fluid carried by a second conduit to an atmospheric air by using a free cooling device, thereby causing the second fluid to have a post-cooling temperature. In one embodiment, the free cooling device may include one or more free cooling towers, such that an icing condition thereof may be detected and addressed during the heat transfer.

In step 1006, heat may be exchange between the first fluid and the second fluid by using a heat exchanger, thereby causing the first fluid to have a pre-loading temperature and the second fluid to have a pre-cooling temperature.

In step 1008, a first flow rate of the first fluid within the first conduit and a second flow rate of the second fluid within the second conduit may be controlled by using a fluid flow control device, such that the post-cooling temperature may be less than the pre-loading temperature by at least a predefined temperature. In one embodiment, the predefined temperature may range from about 1° C. to about 6° C. In another embodiment, the first flow rate may be based on the pre-loading temperature, and the second flow rate may be based on the post-cooling temperature. In yet another embodiment, the first flow rate may be decreased when a first difference between the post-loading temperature and the pre-loading temperature decreases, and the second flow rate may be increased when a second difference between the pre-cooling temperature and the post-cooling temperature decreases.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A free cooling system, comprising:
   first and second conduits configured to carry first and second fluids respectively, the first fluid is configured to circulate within the first conduit, the second fluid is a liquid and is configured to circulate within the second conduit;
   a cooling load configured to engage the first conduit, and is configured to transfer heat to the first fluid, thereby causing the first fluid to have a post-loading temperature;
   a free cooling device configured to engage the second conduit, and is configured to transfer heat from the second fluid in a liquid state to atmospheric air, thereby causing the second fluid to have a post-cooling temperature;
   a heat exchanger configured to engage the first and second conduits, and configured to facilitate a heat exchange between the first and second fluids with the first and second conduits, thereby causing the first fluid to have a pre-loading temperature and the second fluid to have a pre-cooling temperature; and
   a fluid flow control device coupled to the first and second conduits, and configured to control a first flow rate of the first fluid and a second flow rate of the second fluid, such that the post-cooling temperature is less than the pre-loading temperature by at least a predefined temperature.

2. The system of claim 1, wherein the predefined temperature ranges from about 1° C. to about 6° C.

3. The system of claim 1, wherein the first flow rate is based on the pre-loading temperature and the second flow rate is based on the post-cooling temperature.

4. The system of claim 1, wherein the first flow rate is configured to decrease when a first difference between the post-loading temperature and the pre-loading temperature decreases, and the second flow rate is configured to increase when a second difference between the pre-cooling temperature and the post-cooling temperature decreases.

5. The system of claim 1, wherein the fluid flow rate control device includes
   a first flow rate control device coupled to the first conduit, and configured to circulate the first fluid within the first conduit at the first flow rate, and
   a second flow rate control device coupled to the second conduit, and configured to circulate the second fluid within the second conduit at the second flow rate.

6. The system of claim 1, wherein:
   the free cooling device includes a plurality of free cooling towers, such that at least one of the plurality of free cooling towers is selected to couple to the second conduit for transferring heat from the second fluid to the atmospheric air, and
   the plurality of free cooling towers are selected based on the pre-loading temperature, the post-cooling temperature, and icing conditions of the plurality of free cooling towers.

7. The system of claim 1, further comprising:
   a first temperature sensing device coupled to the first conduit, and configured to sense the post-loading temperature;
   a second temperature sensing device coupled to the first conduit, and configured to sense the pre-loading temperature;
   a third temperature sensing device coupled to the second conduit, and configured to sense the post-cooling temperature;
   a fourth temperature sensing device coupled to the second conduit, and configured to sense the pre-cooling temperature; and
   a processor coupled to the first, second, third, and fourth temperature sensing devices, the processor configured to receive the pre-loading, post-loading, pre-cooling, and post cooling temperatures, and configured to generate first and second flow rate signals configured to be received by the fluid flow control device, the first flow rate signal configured to control the first flow rate based on the post-loading and pre-loading temperatures, the second flow rate signal configured to control the second flow rate based on the post-cooling and pre-cooling temperatures.

8. The system of claim 1, wherein:
   the first conduit includes first, second, third, and fourth sections forming a first closed loop, the first section is engaged by the cooling load such that heat is transferred from the cooling load to the first fluid within the first section, thereby causing the first fluid within the second section to have the post-loading temperature,
   the second conduit includes first, second, third, and fourth sections forming a first closed loop, the first section is engaged by the free cooling device such that heat is transfer from the second fluid within the first section to the atmospheric air, thereby causing the second fluid within the second section to have the post-cooling temperature, and
   the third sections of the first and second conduits are engaged by the heat exchanger, so as to facilitate heat exchange between the first and second fluid within the third sections of the first and second conduits, thereby causing the first fluid within the fourth section of the first conduit to have the pre-loading temperature and the second fluid within the fourth section of the second conduit to have the pre-cooling temperature.

9. The system of claim 8, further comprising:
a first storage tank coupled to the first conduit, and configured to store the first fluid within the fourth section of the first conduit; and
a second storage tank coupled to the second conduit, and configured to store the second fluid within the second section of the second conduit.

10. The system of claim 1, further comprising:
a chiller device; and
a bypass valve coupled between the chiller device and the first conduit, and configured to engage the chiller device to the first conduit when a difference between the pre-loading temperature and the post-cooling temperature is less than the predefined temperature value, thereby enabling the chiller device to absorb heat from the first fluid within the first conduit.

11. A free cooling system, comprising:
a first conduit having first, second, third, and fourth sections, and configured to carry a first fluid, the first, second, third, and fourth sections forming a first closed loop;
a second conduit having first, second, third, and fourth sections, and configured to carry a second fluid, the first, second, third, and fourth sections forming a second closed loop;
a cooling load configured to engage the first section of the first conduit, and configured to transfer heat to the first fluid within the first section of the first conduit, thereby causing the first fluid within the second section of the first conduit to have a post-loading temperature;
a valve connected to the third section of the first conduit;
a cooling device connected to the valve, the valve configured to allow the first fluid to flow through the cooling device or the third section of the first conduit;
a free cooling device configured to engage the first section of the second conduit, and configured to transfer heat from the second fluid within the first section of the second conduit to an atmospheric air, thereby causing the second fluid within the second section of the second conduit to have a post-cooling temperature;
a heat exchanger configured to engage the third sections of the first and second conduits, and configured to facilitate a heat exchange between the first and second fluid within the third sections of the first and second conduits, thereby causing the first fluid within the fourth section of the first conduit to have a pre-loading temperature and the second fluid within the fourth section of the second conduit to have a pre-cooling temperature; and
a fluid flow control device connected to the first and second conduits, and configured to control a first flow rate of the first fluid and a second flow rate of the second fluid, such that the post-cooling temperature is less than the pre-loading temperature by at least a predefined temperature.

12. The system of claim 11, wherein the predefined temperature ranges from about 1° C. to about 6° C.

13. The system of claim 11, wherein the first flow rate is based on the pre-loading temperature, and the second flow rate is based on the post-cooling temperature.

14. The system of claim 11, wherein the first flow rate is based on a first difference between the post-loading temperature and the pre-loading temperature, and the second flow rate is based on a second difference between the pre-cooling temperature and the post-cooling temperature.

15. The system of claim 11, wherein:
the cooling device comprises a chiller device; and
the valve comprises a bypass valve connected between the chiller device and the third section of the first conduit, and configured to engage the chiller device to the third section of the first conduit when a difference between the pre-loading temperature and the post-cooling temperature is less than the predefined temperature value, thereby enabling the chiller device to absorb heat from the first fluid within the third section of the first conduit.

16. The system of claim 11, wherein:
the free cooling device includes a plurality of free cooling towers, such that at least one of the plurality of free cooling towers is selected to couple to the first section of the second conduit for transferring heat from the second fluid within the first section of the second conduit to the atmospheric air, and
the plurality of free cooling towers are selected based on the pre-loading temperature, the post-cooling temperature, and icing conditions of the plurality of free cooling towers.

17. A method for operating a free cooling system, comprising the steps of:
transferring heat from a cooling load to a first fluid carried by a first conduit, thereby causing the first fluid to have a post-loading temperature;
transferring heat from a second fluid that is a liquid carried by a second conduit to an atmospheric air by using a free cooling device, thereby causing the second fluid to have a post-cooling temperature;
exchanging heat between the first fluid and the second fluid by using a heat exchanger, thereby causing the first fluid to have a pre-loading temperature and the second fluid to have a pre-cooling temperature; and
controlling a first flow rate of the first fluid within the first conduit and a second flow rate of the second fluid within the second conduit by using a fluid flow control device, such that the post-cooling temperature is less than the pre-loading temperature by at least a predefined temperature.

18. The method of claim 17, wherein the predefined temperature ranges from about 1° C. to about 6° C.

19. The method of claim 17, wherein the first flow rate is based on the pre-loading temperature and the second flow rate is based on the post-cooling temperature.

20. The method of claim 17, wherein the controlling step includes:
decreasing the first flow rate when a first difference between the post-loading temperature and the pre-loading temperature decreases, and
increasing the second flow rate when a second difference between the pre-cooling temperature and the post-cooling temperature decreases.

* * * * *